United States Patent Office 2,820,065
Patented Jan. 14, 1958

2,820,065

2,4-DI-(TERTIARY-BUTYL)-6-CHLOROANISOLE

Harold R. Slagh, Midland, Mich., assignor to The Dow Chemical Company, Midland, Mich., a corporation of Delaware No Drawing. Application January 19, 1956
Serial No. 560,079

1 Claim. (Cl. 260—612)

This invention is concerned with 2,4-di-(tertiarybutyl)-6-chloroanisole having the formula:

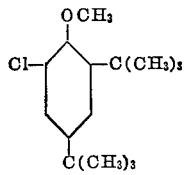

This new compound is a colorless oil somewhat soluble in many common organic solvents and of very low solubility in water. It has been found to be particularly valuable as a herbicide and seedicide and may be employed as an active constituent of compositions for the control of plant growth and for the sterilization of soil with regard to plant growth.

The compound of this invention is conveniently prepared by the reaction of 2,4-di-(tertiary-butyl)-6-chlorophenol with an alkaline reagent such as sodium methoxide, sodium hydroxide and potassium carbonate to form the alkali metal salt of the phenol having the structure:

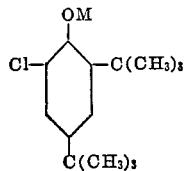

wherein M represents sodium or potassium. The alkali metal salt of the phenol is then caused to react with a methylating agent such as methyl iodide, methyl bromide, methyl chloride and dimethyl sulfate to obtain the desired 2,4-di-(tertiarybutyl)-6-chloroanisole product.

In the preferred method of carrying out this reaction, equimolecular proportions of 2,4-di-(tertiary-butyl)-6-chlorophenol and sodium methoxide are combined in methanol solvent. To the resulting solution is added a small molecular excess of a methyl halide, such as methyl iodide, methyl bromide and methyl chloride. The reaction takes place in the temperature range of from 40° to 60° C. with the formation of the 2,4-di-(tertiary-butyl)-6-chloroanisole product and a sodium halide by-product. The alcohol solvent is removed by evaporation and the residue washed with water to remove the sodium halide. The oily residue may then be distilled to obtain the purified product.

The method employed in carrying out this reaction will vary slightly depending on the methyl halide used. When methyl iodide is employed, it is added portionwise to the reaction mixture containing the sodium derivative of 2,4-di-(tertiary-butyl)-6-chlorophenol. After the addition, the mixture is heated for about two hours. When methyl bromide or methyl chloride is used, the halide is bubbled into the reaction mixture in a closed vessel and the heating carried out in a closed system. Alternatively, the methyl bromide or methyl chloride may be bubbled through the reaction mixture while the latter is being heated at reflux temperature.

In a representative preparation, 6.9 grams (0.3 mole) of sodium was added to 150 milliliters of methanol to form a solution of sodium methoxide in methanol. The latter was added to a solution of 72.15 grams (0.3 mole) of 2,4-di-(tertiary-butyl)-6-chlorophenol in 50 milliliters of methanol. To the resulting reaction mixture was added portionwise, 50 grams (0.35 mole) of methyl iodide while the temperature was maintained at 30° C. The mixture was first heated at 40° to 45° C. for 1.5 hours and then at 55° to 60° C. for 0.5 hour. After completion of the heating, the methanol solvent was removed from the reaction mixture by evaporation and the residue washed with water to remove the sodium iodide. The remaining oil was distilled to obtain 68 grams of the desired 2,4-di-(tertiary-butyl)-6-chloroanisole as a colorless liquid boiling at 108°–109° C. at 4 millimeters pressure. This corresponds to a yield of 89 percent.

The 2,4-di-(tertiary-butyl)-6-chloroanisole product of the present invention is valuable for the treatment of soil for controlling the growth of seeds and emerging seedlings of many undesirable plant species. For such use, the compound may be applied as a constituent of dusts, aqueous dispersions or emulsions or as a solution in an organic solvent. In a representative operation, 2,4-di-(tertiary-butyl)-6-chloroanisole gave 95 percent control of vegetation when applied at a dosage of 50 pounds per acre to soil planted with seeds of Japanese millet, Echinochloa frumentacea. The compound was applied to the soil as a dilute dispersion in water.

I claim:
2,4-di-(tertiary-butyl)-6-chloroanisole.

References Cited in the file of this patent
UNITED STATES PATENTS 2,396,513    Jones _____ Mar. 12, 1946

OTHER REFERENCES

Carpenter et al.: Jour. Org. Chem., vol. 16 (1951), pp. 586–620.